United States Patent [19]

Ballard

[11] Patent Number: 4,688,697

[45] Date of Patent: Aug. 25, 1987

[54] GUIDE FOR METERING DEVICE

[75] Inventor: Gary R. Ballard, Royal Oak, Mich.

[73] Assignee: Automation Service Equipment, Inc., Warren, Mich.

[21] Appl. No.: 713,124

[22] Filed: Mar. 18, 1985

[51] Int. Cl.⁴ .................... B65H 3/30; B66F 11/00
[52] U.S. Cl. ..................... 221/298; 198/463.4; 193/40; 414/748
[58] Field of Search ............... 193/32, 35 A, 40; 221/251, 298; 414/748; 198/463.4, 463.6; 308/3 R; 403/13, 14; 252/12

[56] References Cited

U.S. PATENT DOCUMENTS

| | | | |
|---|---|---|---|
| 2,983,552 | 5/1961 | Norton et al. | 308/3 R |
| 3,908,038 | 9/1975 | Nienart et al. | 252/12 X |
| 4,001,124 | 1/1977 | Hussey | 252/12 |
| 4,053,665 | 10/1977 | Orkin et al. | 252/12 X |
| 4,319,790 | 3/1982 | Thomson | 252/12 X |
| 4,371,445 | 2/1983 | Faigle | 252/12 |
| 4,377,368 | 3/1983 | Koch | 414/748 |
| 4,397,386 | 8/1983 | Kampf | 198/491 |
| 4,532,054 | 7/1985 | Johnson | 252/12 X |

*Primary Examiner*—Robert J. Spar
*Assistant Examiner*—Jay I. Alexander
*Attorney, Agent, or Firm*—Rhodes and Boller

[57] ABSTRACT

A one-piece unitary guide member for guiding an article-engaging member of a metering device is disclosed. The guide member is fabricated from a rigid non-metallic material to form a through-hole having a rectangular transverse cross section just slightly larger than that of the article-engaging member which it guides. Apertures are formed in the guide member to provide for its attachment to a base plate by means of screws. The apertures are in a rectangular pattern which is offset lengthwise of the guide member so that two apertures are closely adjacent one edge. The guide member has a generally rectangular shape and is formed with wall structures which are of generally uniform thickness.

15 Claims, 9 Drawing Figures

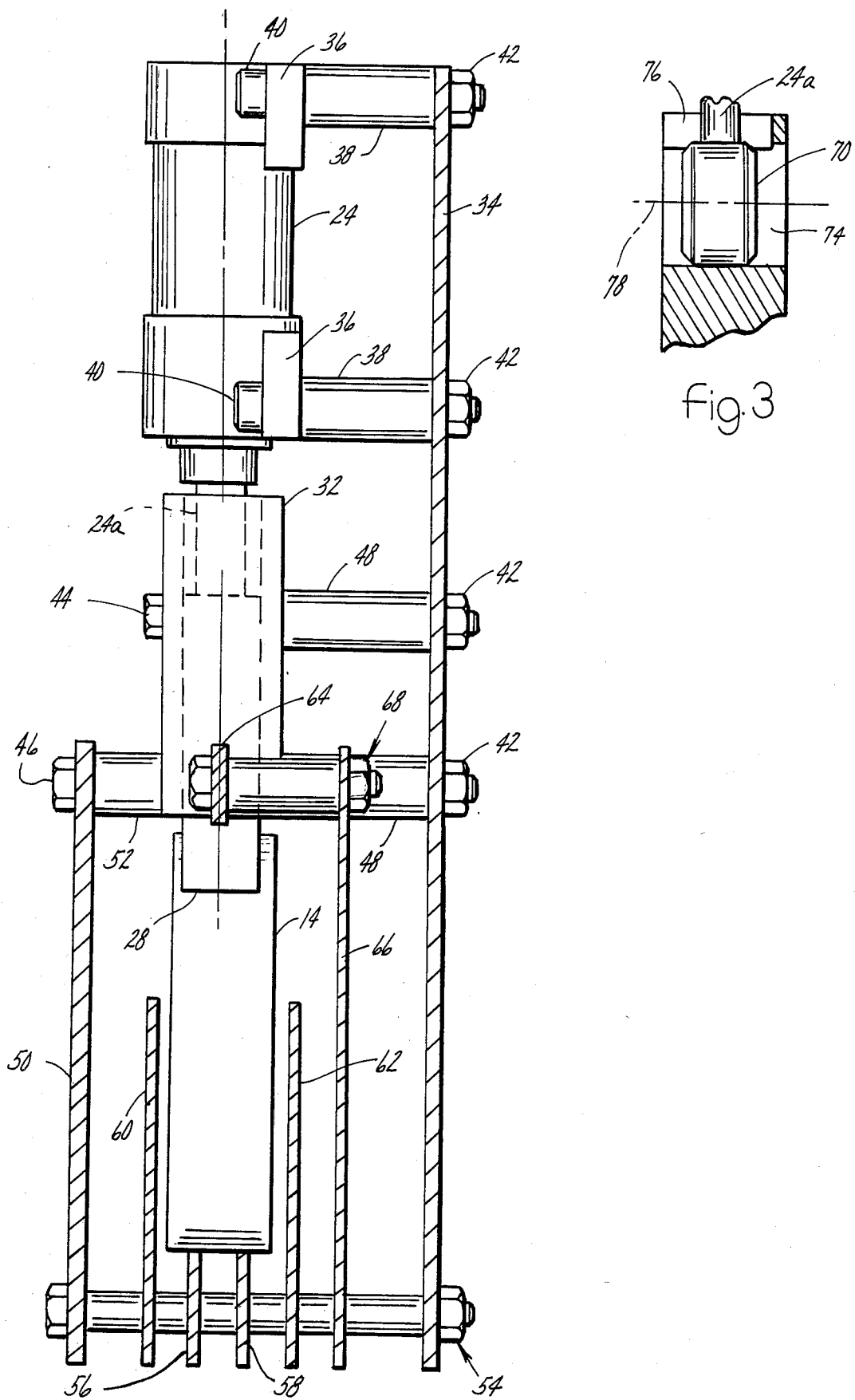

GUIDE FOR METERING DEVICE

BACKGROUND AND SUMMARY OF THE INVENTION

This invention relates to a guide for a metering device and like devices.

Certain types of automated production lines use chuting for the conveyance of articles. Individual articles move along the conveyance path in succession, one after another. Metering devices are utilized with the chuting to perform positioning operations on the articles.

One type of metering device is known as a gate. The gate operates to release articles one at a time.

A typical construction for a gate comprises a pair of fluid-operated cylinders arranged side-by-side adjacent the conveyance path along the chuting. An article-engaging member is connected to the free end of the rod of each cylinder by a thrust block. Each article-engaging member is guided by a guide structure for straight line motion in a direction which is transverse to the direction of motion of the articles along the conveyance path. Typically the transverse motion of each article-engaging member is perpendicular to the direction of travel of the articles along the conveyance path. The article-engaging members are typically spaced apart along the length of the conveyance path approximately one article apart, though this spacing distance may be different in some instances.

The cylinders are operable to extend and retract the respective article-engaging members whereby in the extended position the corresponding article-engaging member is positioned in the conveyance path and in the retracted position it is positioned out of the conveyance path. The cylinders are typically operated at the same time but in opposite directions. In other words when one cylinder rod is extended, the other is retracted and vice versa.

When the downstream cylinder is extended and the upstream one retracted, the downstream cylinder's article-engaging member blocks the flow of articles so that a succession of articles can accumulate behind it. When the gate is then operated to retract the downstream cylinder and extend the upstream one, the first article in the accumulation is released while the remainder of the articles behind it are arrested by the extended upstream cylinder.

A further cycling of the gate causes the upstream cylinder to retract and the downstream cylinder to extend whereby what is now the first article in the accumulation is allowed to advance to the extended downstream cylinder, and the next cycling of the gate will release that article.

Based upon this description, it can be appreciated that the gate is effective to release bhe articles one at a time.

Any given piece of automation equipment may comprise a number of such metering devices at different locations.

Metering devices may perform other than the gating function just described. For example, a shot bolt comprises a single cylinder and article-engaging member for performing an operation on an article which may involve either orienting the article in a particular way on the conveyance path or stopping the article.

From the standpoint of assembly considerations, the use of a thrust block connection between the cylinder rod and the article-engaging member is advantageous.

A thrust block is a standard part which can be readily attached to the end of the cylinder rod. A suitable hole and slot can be machined in one end of the article-engaging member to allow the article-engaging member to be slipped onto the thrust block without the use of any other attaching parts. The thrust block connection provides a joint which contains a certain range over which the article-engaging member can move angularly relative to the cylinder rod about an axis which passes through the joint transversely of the length of the cylinder rod. By providing this limited pivotal capability, precise alignment of the cylinder rod is not critical, and the guide structure alone guides the travel of the article-engaging member. The guide structure also preferably encloses the thrust block joint throughout the range of travel of the article-engaging member.

The article-engaging member is typically fabricated from a bar of rectangular transverse cross section because such bar stock is readily available and its ends can be machined to the desired shapes for the thrust block and for engagement with the articles.

Heretofore it has been conventional practice to fabricate the guide structure from multiple metal parts assembled together. For example, a typical construction for such a guide structure comprised a pair of guide blocks spaced apart parallel to each other to form the sides. Base and cover plates sandwiched the guide blocks so that a guideway of rectangular cross section was thereby co-operatively defined by the four pieces. Each guide block contained a pair of spaced apart holes, and the base and cover plates each comprised a rectangular pattern of four holes. Fasteners such as screws passed through the holes in the cover plate, through the holes in the guide blocks and through the holes in the base plate to secure the several parts in assembled relationship. The holes in the guide blocks and in at least one, and usually both, of the base and cover plates were merely clearance holes.

In order to fabricate a metering device it was necessary to handle a number of individual parts and then to assemble them together. In the assembly of the parts the potential existed for the two guide blocks to have too loose a fit and/or some degree of non-parallelism with respect to the article-engaging member between them because they were separate pieces and because they had merely clearance holes. Not only were a number of individual pieces required to be fabricated in order to construct a guide, but these parts required a certain amount of time for their assembly and the assembly was often cumbersome, especially difficult where the gate is arranged vertically and the guides are required to be vertical. The person assembling the various parts had to manipulate them, hold them in place and then tighten the fasteners after the parts had been assembled. Even at that, the potential existed that the completed assembly would have the guide blocks in other than an optimum engagement with the article-engaging member.

While such a guide construction might initially perform satisfactorily, a less than optimum alignment often resulted in accelerated wear, extra noise, and even aggravated the alignment. For example, repeated impacting of an article-engaging member by articles could result in loosening of the assembled parts because of the manner in which the guide structure reacted the effect of impact loads imposed on the article-engaging member by the articles being gated. An example of this is illustrated in a vertical gate for controlling part flow along a declined chute. Where an article-engaging member is disposed in the conveyance path to arrest the flow, it is possible that an article could impact the article-engaging member with a significant amount of momentum. This would be reacted by the guide blocks in such a way that it could tend to spread the guide blocks apart and/or loosen the assembly.

The present invention is directed to an improved guide for a metering device of the type described. The invention possesses a number of significant improvements over the prior multi-piece guide structure.

An especially significant improvement is that the guide of the present invention comprises a one-piece unitary member of a rigid, dimensionally stable non-metallic material. An example of a suitable material is glass, teflon-filled material The guide member can be fabricated from conventional injection molding techniques so that it eliminates the separate guide blocks and cover and base plates which were required of prior guide structures.

The guide member of the present invention is preferably fabricated in a generally rectangular overall shape to comprise a through-hole of rectangular cross section just slightly larger than the rectangular cross section of the article engaging member which it guides. Because the guide member of the present invention is molded as one piece the through-hole's walls are always accurately related to each other. Hence the possibility for misaligned or poorly fitting guide blocks characteristic of the prior construction is avoided through use of the present invention. Moreover, because the present invention is a one-piece construction, it can be more easily and quickly assembled into a metering device.

The invention is efficient in its use of material forming the guide member, and certain specific details constitute further inventive features. The present invention offers significant savings not only from the standpoint of part cost but also from the standpoint of assembly cost. Moreover, the invention has further functional attributes which when put to use may be fairly said to include improved wear characteristics and lower noise levels.

The foregoing features, advantages, and benefits of the invention, along with additional ones, will be seen in the ensuing description and claims which should be considered in conjunction with the accompanying drawings. The drawings disclose a preferred embodiment of the invention according to the best mode contemplated at the present time for carrying out the invention.

BRIEF DESCRIPTION OF THE DRAWINGS

FIG. 2 is a sectional view taken generally in the direction of arrows 2—2 in FIG. 1.

FIG. 3 is a fragmentary cross sectional view taken in the direction of arrows 3—3 in FIG. 1, and slightly enlarged.

DESCRIPTION OF THE PREFERRED EMBODIMENT

Figure 1:
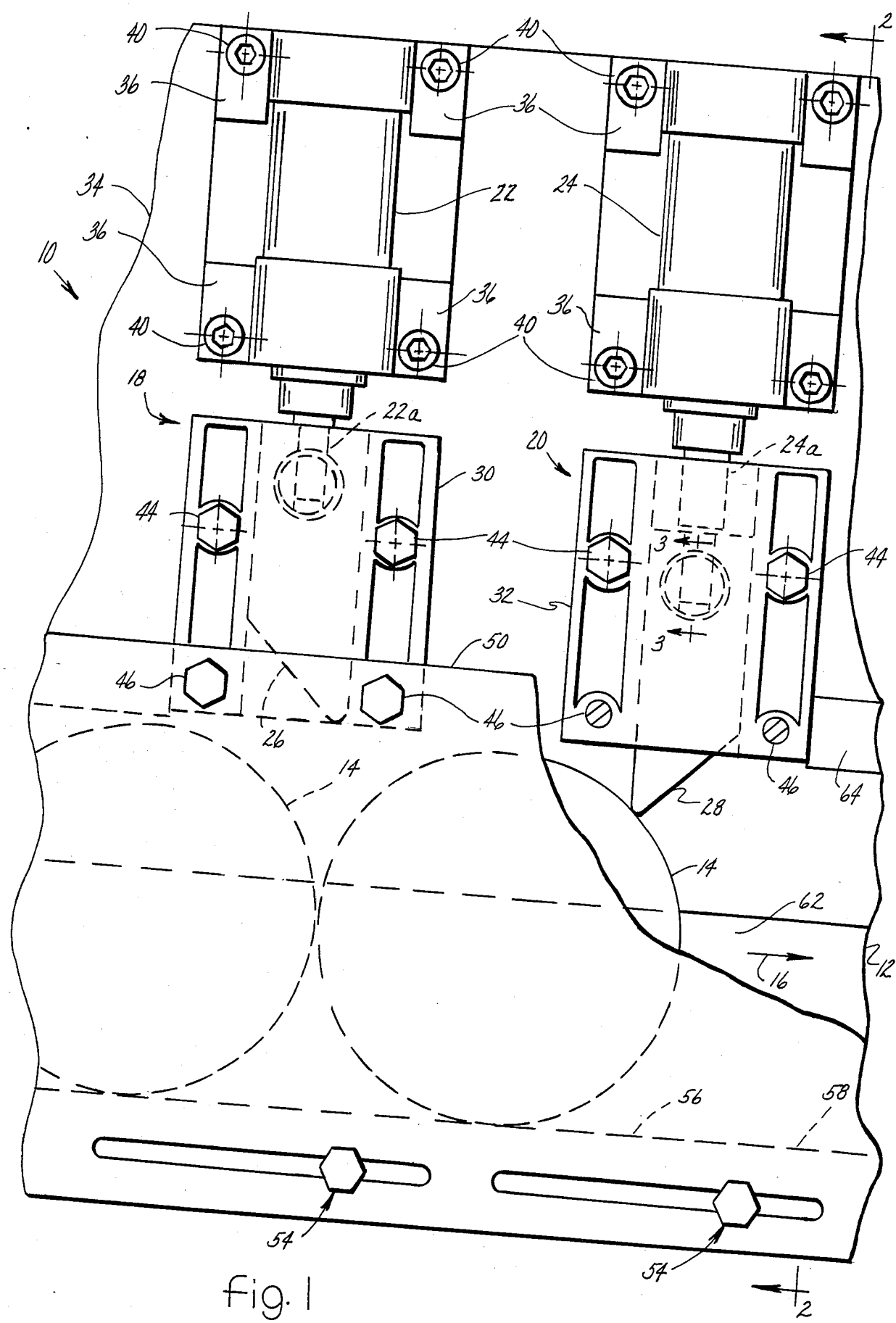
FIG. 1 is a fragmentary front elevational view, having portions broken away for clarity, illustrating one type of metering device with the improvement of the present invention.

FIGS. 1 and 2 illustrate an exemplary usage of the present invention as a gate 10 mounted on ride rail chuting 12. Ride rail chuting 12 is conventional chuting fabricated from tempered steel strips for the conveyance of articles which have the ability to roll. Hence FIG. 1 shows the ride rail chuting to be declined from left to right for conveyance of round articles 14 along a conveyance path 16 representing the direction of flow.

Gate 10 comprises a pair of metering devices 18 and 20, device 18 being upstream of device 20 along the direction of flow. The two devices 18 and 20 are essentially identical and comprise respective fluid-operated cylinders 22 and 24, respective article-engaging members 26 and 28, and respective guide members 30 and 32 which embody principles of the present invention.

The two cylinders 22, 24 and the two guide members 30, 32 are securely mounted on a rigid base plate 34. Each cylinder has apertured mounting flanges 36 which are spaced from base plate 34 by tubular spacers 38. The shank of a headed screw of suitable length is passed through each of the apertured mounting flanges 36, through the corresponding spacer 38, and through a hole in base plate 34, and a nut 42 is fastened onto the distal end of the screw which projects beyond base plate 34 and tightened.

A similar arrangement mounts each of the two guide members 30, 32 on base plate 34; however, the screws are longer and different spacers are used. Four screws are used to mount each guide member, comprising a pair of screws 44 and a pair of screws 46. The screws 44 are passed through respective apertures in the guide members, through corresponding spacers 48, and holes in base plate 34 and nuts 42 are threaded onto the projecting ends of the screw shanks and tightened.

A front plate 50 is arranged parallel to plate 34 on the opposite side of the chuting and contains holes along its upper margin. Screws 46 are passed through these holes, through corresponding spacers 52, through apertures in guide members 30 and 32, through spacers 48 and through corresponding holes in base plate 34. Nuts 42 are fastened onto the distal ends of the shanks of screws 46 and tightened.

The ride rail chuting 12 and gate 10 are joined together at locations along the bottom by a succession of spacers and screws and nuts which are designated by the general reference 54. The illustrated construction for the ride rail chuting comprises a pair of spaced apart ride rails 56, 58 along whose upper edges articles 14 can roll. It also comprises a pair of side rails 60 and 62 which are spaced outwardly of the articles to provide lateral constraint and which extend preferably to a height which is about 60% of the diameter of the articles. A retaining rail 64 is supported in overlying relationship to articles 14 above the two ride rails to provide vertical constraint.

The rails 56, 58, 60 and 62 extend along the full length of the chuting. The retaining rail 64 is supported at intervals along the length of the chuting by means of uPright brackets 66 fastened at the bottom as shown and utilizing a spacer, screw, and nut attachment 68 for the retaining rail 64. The joining arrangements 54 exist at regular intervals along the length of the chuting, and the rails 56, 58, 60, 62 and 64 are typically constructed from tempered spring steel. Rail 64 also extends along the full length of the chuting but may be interrupted, such as at a gate, as shown.

Cylinders 22, 24 comprise respective cylinder rods 22a, 24a. Rod 22a is shown in the retracted position in FIG. 1 and rod 24a in the extended position. For the retracted position of rod 22a, its article-engaging member 26 is positioned out of the path of travel of the conveyed articles. For rod 24a in the extended position, its article-engaging member 28 is positioned in the path of travel of the articles. For the position of member 28 illustrated in the drawing figure, the flow of articles along conveyance path 16 is arrested by member 28, and this allows the articles to be accumulated upstream.

The cylinders are typically operated out of phase with each other. In other words, when one is extended the other is retracted, and vice versa. If the cylinders are cycled from the position of FIG. 1, article-engaging member 26 is advanced into the path of travel to hold any articles which have accumulated upstream of the article which is between the two metering devices. The concurrent operation of cylinder 24 retracts article-engaging member 28 to release the article 14 between the two metering devices.

After the released article has cleared the gate, the cylinders may be again cycled to retract article-engaging member 26 and extend article-engaging member 28. This allows the accumulated articles to advance one article so that the next article comes into contact with member 28. A further cycling of the cylinders releases the next article. From this description one can see that the cycling of the gate is effective to release articles one at a time.

Figure 4:
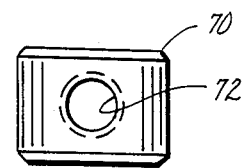
FIGS. 4 and 5 are elevational and plan views of one of the component parts of FIG. 3.
Figure 9:
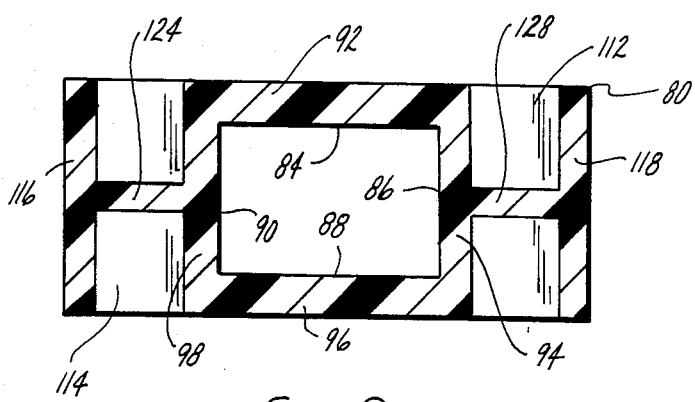
FIG. 9 is a transverse cross sectional view taken in the direction of arrows 9—9 in FIG. 6.
Figure 5:
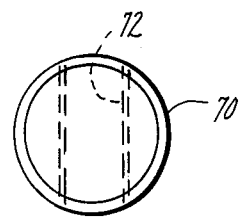

The manner of connecting each article-engaging member with the corresponding cylinder rod advantageously utilizes a thrust block. Details of a thrust block and its connection with an article-engaging member are shown by FIGS. 3, 4, and 5.

Thrust block 70 is a generally circular element having a diametrically extending tapped through-hole 72 which allows the thrust block to be threaded onto the standard threaded end of a standard cylinder rod. The article-engaging member is provided at one lengthwise end with a circular hole 74 of just slightly larger diameter of the outside diameter of thrust block 70. A clearance slot 76 is also provided so as to allow the article-engaging member to be slipped onto the thrust block in the manner shown by FIG. 3.

This arrangement is advantageous because it requires no additional attaching parts. The connection forms a joint which allows a certain amount of pivotal movement of the article-engaging member relative to the cylinder rod about an axis such as 78. Because of this range of pivoting, precise alignment of the cylinder with the guide block is not required, and hence this particular type of connection has definite advantages in a metering device.

Assembly of a metering device is facilitated because each guide member is one-piece. For example the guide member can be assembled to the base plate before the cylinder. The article-engaging member is partially inserted, the thrust block connection is made, and then the cylinder is itself mounted on the base plate.

Figure 6:
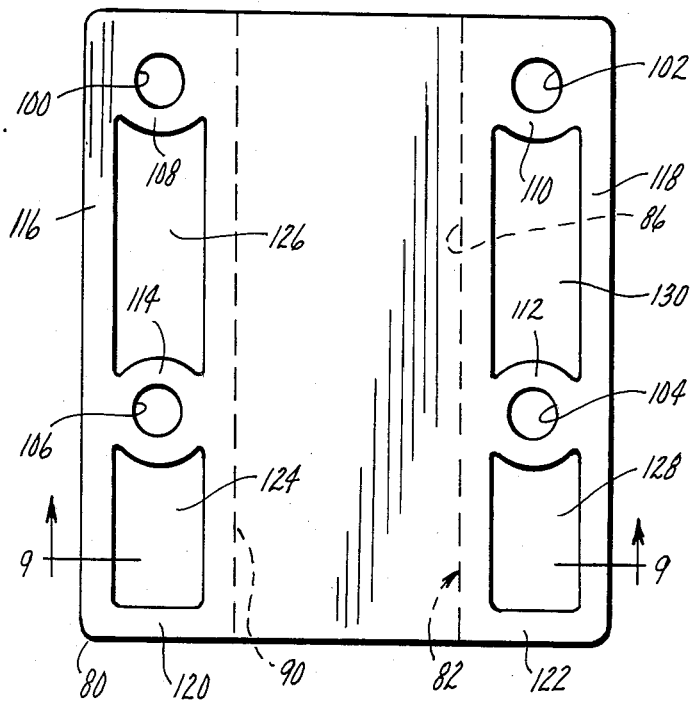
FIG. 6 is a plan view of a preferred embodiment of guide member according to principles of the present invention.
Figure 7:
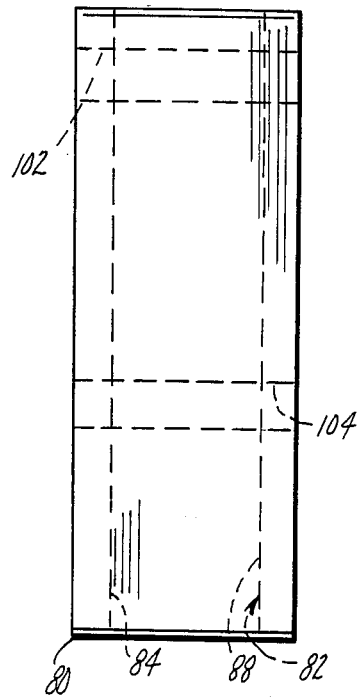
FIG. 7 is a right side elevational view of FIG. 6.
Figure 8:
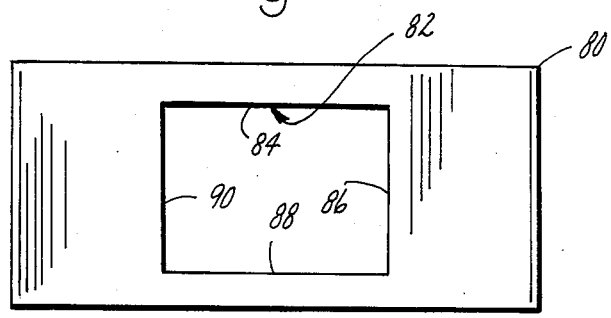
FIG. 8 is a front elevational view of FIG. 6.

FIGS. 6, 7, 8 and 9 illustrate details of one of the two guide members 30 and 32 which are identical. The guide member comprises a unitary one piece body 80 of generally rectangular overall shape and constructed from rigid, dimensionally stable, non-metallic material. The preferred material is a glass, teflon-filled one which can be fabricated by conventional molding techniques. For descriptive purposes, the terms length, width and thickness will be used in their usual sense as applied to a rectangular shaped article whereby FIG. 6 illustrates the length and the width, FIG. 7 the length and the thickness, and FIG. 8 the width and the thickness.

Body 80 comprises a through-hole 82 extending lengthwise the full length of the guide merber. The throughhole comprises a rectangular transverse cross section formed by wall surfaces 84, 86, 88 and 90, and it is centered with respect to the width and thickness of body 80. These wall surfaces are arranged such that the cross sectional area is just slightly larger than the cross section of the article-engaging member. The wall surfaces 84, 86, 88 and 90 are surfaces of respective solid wall portions 92, 94, 96 and 98 which extend lengthwise for the full length of the guide member, bounding through-hole 82.

Body 80 is provided with four apertures 100, 102, 104, 106 arranged in a rectangular pattern as shown. These apertures are formed in generally circular walled portions 108, 110, 112 and 114 respectively which join tangentially with the solid walls 94 and 98. Specifically, the circular walled portions 108, 114 join with solid wall 98, and the circular walled portions 110, 112 join with solid wall 94. Hence, the four apertures are arranged widthwise of the guide member two to each side of through-hole 82. The apertures are also arranged such that their axes are perpendicular a plane passing through one of the wall surfaces of the through-hole; for example, in the disclosed embodiment they are perpendicular to an imaginary plane passing through wall surface 84 as well as an imaginary plane passing through wall surface 88, the two wall surfaces 84 and 88 being parallel with each other.

Body 80 further includes outside walls 116, 118 which are on opposite sides of through-hole 82 widthwise of the guide member. The circular wall portions 108, 110, 112 and 114 join tangentially with these outside walls 116, 118 in the manner shown. Specifically wall portions 114, 108 join with outside wall 116, and wall portions 110, 112 join with outside wall 118.

Rigidifying wall structure is also provided and comprises walls 120 and 122 at one lengthwise end of the guide member which respectively join outside walls 116, 118 respectively with walls 92, 94, 96 and 98. The rigidifying wall structure further includes wall portions 124 and 126 joining wall 98 with outside wall 116 and wall portions 128, 130 joining wall 94 with outside wall 118. The wall portions 124, 126, 128 and 130 are in a common plane disposed in the middle of the guide member as measured in the direction of the guide member's thickness.

It is to be observed that the rectangular pattern of apertures 100, 102, 104, 106 is offset lengthwise of the guide member. The apertures 100, 102 are disposed closely adjacent one lengthwise end while the apertures 104, 106 are disposed more toward the middle of the guide member, as measured lengthwise thereof, than they are to the opposite lengthwise end. In the illustrated embodiment the axis of each aperture 100, 102 is located essentially at one and one half times its diameter from the adjacent lengthwise end of the guide member. This enables the guide member to be incorporated into the gate shown in FIG. 1 by utilizing the apertures 100, 102 as the lower holes so that the adjacent lengthwise end of the guide member is positioned generally at the same level as the lower edge of the retaining rail 64 whereby there is sufficient clearance to the underlying articles. The lower lengthwise end of the guide member bridges the gap in the retaining rail which is created by the assembly of the gate mechanism into the chuting. Other arrangements for use of the guide member are possible. For instance the guide member can be reversed end-to-end and/or turned over. The illustrated usage in a vertical gate is merely exemplary. Horizontal, or other orientations, are entirely possible depending upon the application.

FIG. 6 illustrates the corners to be slightly rounded, but the illustrated embodiment has a well-defined rectangular shape. By providing the apertures 100, 102 at two of the corners, their circular walled portions 108, 110 join the outside walls 116, 118 at that lengthwise end of the guide member with the wall portions 98 and 94 respectively. Because of the rectangular shape of the guide member, the generally circular shapes of the wall portions 108, 110 are perhaps not quite as readily apparent as are the shapes the other two 114 and 112 which are midway along the length of the guide member.

Preferably the various walls 92, 94, 96, 98, 108 110, 112, 114, 116, 118, 124, 128, and 130 are of generally or equal thickness. This is advantageous from a number of standpoints including fabrication, strength, and efficient use of material.

In the illustrated usage, the guide members also cover the joints between the cylinder rods and the article-engaging members.

It is possible to employ principles of the invention to fabricate guide members having other than the illustrated dimensions of the preferred embodiment. However the illustrated embodiment is advantageous in that it can be cut perpendicular to its length at a desired location to form smaller pieces which can be used alone, or in conjunction with one or more whole guide members.

While a preferred embodiment of the invention has been disclosed it will be appreciated that its principles are applicable to other embodiments.

What is claimed is:

1. In a device, such as a meter, comprising a base disposed adjacent a conveyance path along which individual articles are conveyed in succession one after another, said device being operable to exercise control over positioning of the articles as they move along the conveyance path, said device comprising a fluid-operated cylinder mounted on said base, said cylinder comprising a rod which has a free end and which extends and retracts as the cylinder is cycled, said device comprising an article-engaging member of rectangular transverse cross section which is attached to the free end of the cylinder rod by a joint which contains a certain range over which said member can move angularly relative to the cylinder rod about an axis which passes through the joint transversely of the length of the rod, said member being moveable by the cylinder rod transversely of the conveyance path for positioning into the conveyance path when the cylinder rod is extended and for positioning out of the conveyance path when the cylinder rod is retracted, the improvement which comprises a one-piece unitary guide member of a rigid, dimensionally stable non-metallic material for accurately guiding the transverse movement of said article-engaging engaging member by said cylinder rod, said guide member being disposed just out of the conveyance path, said guide member comprising a straight through-hole having wall surfaces arranged in a rectangular transverse cross section which is just slightly larger than that of said article-engaging member and within which said article-engaging member has a close sliding fit, said guide member comprising a pattern of apertures arranged parallel to one another and perpendicular to a plane passing through one of said wall surface of said through-hole, and fasteners passed into said apertures to securely mount said guide member on said base, in which said guide member has an overall rectangular shape characterized by a length, a width, and a thickness, said apertures extend completely through the thickness of the guide member, the length of said through-hole is parallel to the length of the guide member, said guide member comprises one pair of outside wall surfaces bounding the width of the guide member and another pair of outside wall surfaces bounding the thickness of the guide member, one pair of said through-hole's wall surfaces are parallel with said one pair of outside wall surfaces, another pair of said through-hole's wall surfaces are parallel with said another pair of outside wall surfaces, said another pair of said through-hole's wall surfaces have a dimension as measured widthwise of the guide member which exceeds the dimension of said one pair of said through-hole's wall surfaces as measured thicknesswise of the guide member, said through-hole is centered with respect to said one pair of outside wall surfaces and with respect to said another pair of outside wall surfaces, said through-hole is bounded by four solids walls extending lengthwise for the full length of the guide member, each of said four solid walls having a corresponding one of said through-hole's wall surfaces as a surface thereof, two of said four solid walls each having a portion of a corresponding one of said another part of outside wall surfaces as a surface thereof, and the other two of said four solid walls having surface portions spaced widthwise of the guide member apart from said one pair of outside wall surfaces.

2. The improvement set forth in claim 1 in which the pattern of said apertures comprises one pair of apertures spaced widthwise of the guide member to one side of said through-hole and another pair of apertures spaced widthwise of the guide member to the other side of said through-hole.

3. The improvement set forth in claim 2 in which said two pairs of apertures are arranged in a rectangular pattern which is offset lengthwise of the guide member such that one aperture of each said pair of apertures is nearer one lengthwise end of the guide member than the other aperture of each said pair of apertures is to the other lengthwise end of the guide member.

4. The improvement set forth in claim 3 in which said one aperture of each said pair has a given diameter and the distance from said one lengthwise end of the guide member to the center of each said one aperture does not exceed one and one-half times that aperture's diameter and in which said other aperture of each said pair is disposed nearer the middle of the length of the guide member than said other lengthwise end.

5. In a device, such as a meter, comprising a base disposed adjacent a conveyance path along which individual articles are conveyed in succession one after another, said device being operable to exercise control over positioning of the articles as they move along the conveyance path, said device comprising a fluid-operated cylinder mounted on said base, said cylinder comprising a rod which has a free end and which extends and retracts as the cylinder is cycled, said device comprising an article-engaging member of rectangular transverse cross section which is attached to the free end of the cylinder rod by a joint which contains a certain range over which said member can move angularly relative to the cylinder rod about an axis which passes through the joint transversely of the length of the rod, said member being moveable by the cylinder rod transversely of the conveyance path for positioning into the conveyance path when the cylinder rod is extended and for positioning out of the conveyance path when the cylinder rod is retracted, the improvement which comprises a one-piece unitary guide member of a rigid, dimensionally stable non-metallic material for accurately guiding the transverse movement of said article-engaging member by said cylinder rod, said guide member being disposed just out of the conveyance path, said guide member comprising a straight through-hole having wall surfaces arranged in a rectangular transverse cross section which is just slightly larger than that of said article-engaging member and within which said article-engaging member has a close sliding fit, said guide member comprising a pattern of apertures arranged parallel to one another and perpendicular to a plane passing through one of said wall surfaces of said through-hole, and fasteners passed into said apertures to securely mount said guide member on said base, in which said guide member has an overall rectangular shape characterized by a length, a width, and a thickness and in which said apertures extend completely through the thickness of the guide member, the length of said through-hole is parallel to the length of the guide member, said guide member comprises one pair of outside wall surfaces bounding the width of the guide member and another pair of outside wall surfaces bounding the thickness of the guide member, one pair of said through-hole's wall surfaces are parallel with said one pair of outside wall surface, another pair of said through-hole's wall surfaces are parallel with said another pair of outside wall surfaces, said another pair of said through-hole's wall surfaces have a dimension as measured widthwise of the guide member which exceeds the dimension of said one pair of said through-hole's wall surfaces as measured thicknesswise of the guide member, said through-hole is centered with respect to said one pair of outside wall surfaces and with respect to said another pair of outside wall surfaces, said through-hole is bounded by four solid walls extending lengthwise for the full length of the guide member and of generally equal thickness, each of said four solid walls having a corresponding one of said through-hole's wall surfaces as a surface thereof, two of said four solid walls each having a portion of a corresponding one of said another pair of outside wall surfaces as a surface thereof, and the other two of said four solid walls having surface portions parallel to said through-hole's one pair of wall surfaces but spaced widthwise of the guide member apart from said one pair of outside wall surfaces.

6. The improvement set forth in claim 5 in which the guide member comprises a pair of outside walls extending lengthwise of the guide member and spaced widthwise of the guide member outwardly from said other two solid walls, each of said outside walls having a corresponding one of said one pair of outside wall surfaces as a surface thereof.

7. The improvement set forth in claim 6 in which each of said outside walls joins with the nearer of said other two solid walls by connecting walls, said connecting walls, said outside walls and said four solid walls having generally equal thickness, certain of said connecting walls forming said apertures.

8. In a device, such as a meter, comprising a base disposed adjacent a conveyance path along which individual articles are conveyed in succession one after another, said device being operable to exercise control over positioning of the articles as they move along the conveyance path, said device comprising a fluid-operated cylinder mounted on said base, said cylinder comprising a rod which has a free end and which extends and retracts as the cylinder is cycled, said device comprising an article-engaging member of rectangular transverse cross section which is attached to the free end of the cylinder rod by a joint which contains a certain range over which said member can move angularly relative to the cylinder rod about an axis which passes through the joint transversely of the length of the rod, said member being moveable by the cylinder rod transversely of the conveyance path for positioning into the conveyance path when the cylinder rod is extended and for positioning out of the conveyance path when the cylinder rod is retracted, the improvement which comprises a one-piece unitary guide member of a rigid, dimensionally stable non-metallic material for accurately guiding the transverse movement of said article-engaging member by said cylinder rod, said guide member being disposed just out of the conveynance path, said guide member comprising a straight through-hole having wall surfaces arranged in a rectangular transverse cross section which is just slightly larger than that of said article-engaging member and within which said article-engaging member has a close sliding fit, said guide member comprisng a pattern of apertures arranged parallel to one another and perpedicular to a plane passing through one of said wall surfaces of said through-hole, and fasteners passed into said apertures to securely mount said guide member on said base, in which said guide member has an overall rectangular shape characterized by a length, a width, and a thickness, said apertures extend completely through the thickness of the guide member, the length of said through-hole is parallel to the length of the guide member, the pattern of said apertures comprises one pair of apertures spaced widthwise of the guide member to one side of said through-hole and another pair of apertures spaced widthwise of the guide member to the other side of said through-hole, and in which said through-hole is centered with respect to outside wall surfaces of the guide member as viewed lengthwise of the through-hole, said through-hole being bounded by four solid walls of generally equal thickness, each of said apertures being formed by a generally circular wall, the generally circular walls forming said one pair of apertures joining in a generally tangential manner with one of said solid walls throughout the entire thickness of the guide member, and the generally circular walls forming said other pair of apertures joining in a generally tangential manner with another of said solid walls throughout the entire thickness of the guide member.

9. The improvement set forth in claim 8 including stiffening walls extending widthwise of the guide member from said one and said another of said solid walls away from said through-hole, each of said stiffening walls joining with those of said generally circular walls which lie to the same widthwise side of the through-hole, and including outside walls parallel to and spaced from said one and said another of said solid walls, said outside walls being perpendicular to said stiffening walls, and each generally circular wall forming each said pair of apertures joining in a generally tangential manner with the outside wall which is to the same widthwise side of the through-hole.

10. In a device, such as a meter, comprising a base disposed adjacent a conveyance path along which individual asrticles are conveyed in succession one after another, said device being operable to exercise control over positioning of the articles as they move along the conveyance path, said device comprising a fluid-operated cylinder mounted on said base, said cylinder comprising a rod which has a free end and which extends and retracts as the cylinder is cycled, said device comprising an article-engaging member of rectangular transverse cross section which is attached to the free end of the cylinder rod by a joint which contains a certain range over which said member can move angularly relative to the cylinder rod about an axis which passes through the joint transversely of the length of the rod, said member being moveable by the cylinder rod transversely of the conveyance path for positoning into the conveyance path when the cylinder rod is extended and for positioning out of the conveyance path when the cylinder rod is retracted, the improvement which comprises a one-piece unitary guide member of a rigid, dimensionally stable non-metallic material for accurately guiding the transverse movement of said article-engaging member by said cylinder rod, said guide member being disposed just out of the conveyance path, said guide member comprising a straight through-hole having wall surfaces arranged in a rectangular transverse cross section which is just slightly larger than that of asid article-engaging member and within which said article-engaging member has a close sliding fit, said guide member comprising a pattern of apertures arranged parallel to one another and perpendicular to a plane passing through one of said wall surfaces of said through-hole, and fasteners passed into said apertures to securely mount said guide member on said base, in which said wall surfaces of the through-hole are part of a wall of generally uniform thickness which bounds the through-hole and in which said apertures are formed by generally circular walls of generally uniform radial thickness which join generally tangentially with the wall which bounds said through-hole, and stiffening walls of generally uniform thickness joining the wall which bounds said through-hole and said generally circular walls, all said walls being of generally the same thickness.

11. A guide member for use in guiding an elongate member of rectangular transverse cross section for lengthwise motion along a line of action such as in a meter or like device, said guide member comprising a one-piece unitary body of a rigid, dimensionally stable non-metallic material, said body comprising a straight through-hole having wall surfaces arranged in a rectangular transverse cross section which is just slightly larger than that of the elongate member which is to be guided by the guide member and within which the elongate member will have a close sliding fit, said body comprising a pattern of apertures arranged parallel to one another and perpendicular to a plane passing through one of said wall surfaces of said through-hole, said through-hole being bounded by four solid walls extending lengthwise for the full length of said body and being of generally equal thickness, each of said four solid walls having a corresponding of one of said throughhole's wall surfaces as a surface thereof, said pattern of apertures comprising one pair of apertures disposed to one side of said through-hole and another pair of apertures disposed to the other side of said through-hole, each of said apertures being formed by a generally circular wall with the two generally circular walls forming said one pair of apertures joining in a generally tangential manner with one of said solid walls and the two generally circular walls forming said another pair of apertures joining in a generally tangential manner with another of said solid walls, and wherein said two pairs of apertures are arranged in a rectangular pattern which is offset lengthwise of the body such that one aperture of each said pair of apertures is nearer one lengthwise end of the body than the other aperture of each pair of apertures is to the other lengthwise end of the body.

12. A guide member as set forth in claim 11 further including a pair of stiffening walls extending from said one and said another solid walls away from said throughhole, each of said stiffening walls joining with those of said generally circular walls which lie on the same side of the through-hole and including outside walls parallel to and spaced from said one and said another solid walls, said outside walls being perpendicular to said stiffening walls and the two generally circular walls forming each said pair of apertures joining in a generally tangential manner with the outside wall which is to the same side of the throughhole, said solid walls, said outside walls and said stiffening walls being arranged to provide the member with a generally rectangular overall shape and in which the thicknesses of all said walls are generally uniform.

13. The improvement set forth in claim 12 in which said one aperture of each said pair of apertures has a given diameter and the distance from said one lengthwise end of the body to the center of each said one aperture does not exceed one and a half times that aperture's diameter and in which said other aperture of each pair of apertures is disposed nearer the middle of the length of the body than to the opposite lengthwise end of the body.

14. A guide member for use in guiding an elongate member of rectangular transverse cross section for lengthwise motion along a line of action such as in a meter or like device, said guide member comprising a one piece unitary body of a rigid, dimensionally stable non-metallic material, said body comprising a straight through-hole having wall surfaces arranged in a rectangular transverse cross section which is just slightly larger than that of the elongate member which is to be guided by the guide member and within which the elongate member will have a close sliding fit, said body comprising a pattern of apertures arranged parallel to one another and perpendicular to a plane passing through one of said wall surfaces of said through-hole, said through-hole being bounded by four solid walls extending lengthwise for the full length of said body and being of generally equal thickness, each of said four solid walls having a corresponding one of said through-hole's wall surfaces as a surface thereof, said pattern of apertures comprising one pair of apertures disposed to one side of said through-hole and another pair of apertures disposed to the other side of said through-hole, each of said apertures being formed by a generally circular wall with the two generally circular walls forming said one pair of apertures joining in a generally tangential manner with one of said solid walls and the two generally circular walls forming said another pair of apertures joining in a generally tangential manner with another of said solid walls, and including a pair of stiffening walls extending from said one and said another of said solid walls away from said through-hole, each of said stiffening walls joining with those of said generally circular walls which lie on the same side of the through-hole and including outside walls parallel to and spaced from said one and said another solid walls, said outside walls being perpendicular to said stiffening walls and the generally circular walls forming each said pair of apertures joining in a generally tangential manner with the outside wall which is to the same side of the through-hole, said solid walls, said outside walls and said stiffening walls being arranged to provide the member with a generally rectangular overall shape and in which the thicknesses of all said walls are generally uniform.

15. A guide member as set forth in claim 14 in which each said stiffening wall comprises wall portions which are perpendicular to each other.

* * * * *